Nov. 12, 1940.   O. C. WHITE   2,221,013
FEED TROUGH FOR POULTRY
Filed Aug. 31, 1938
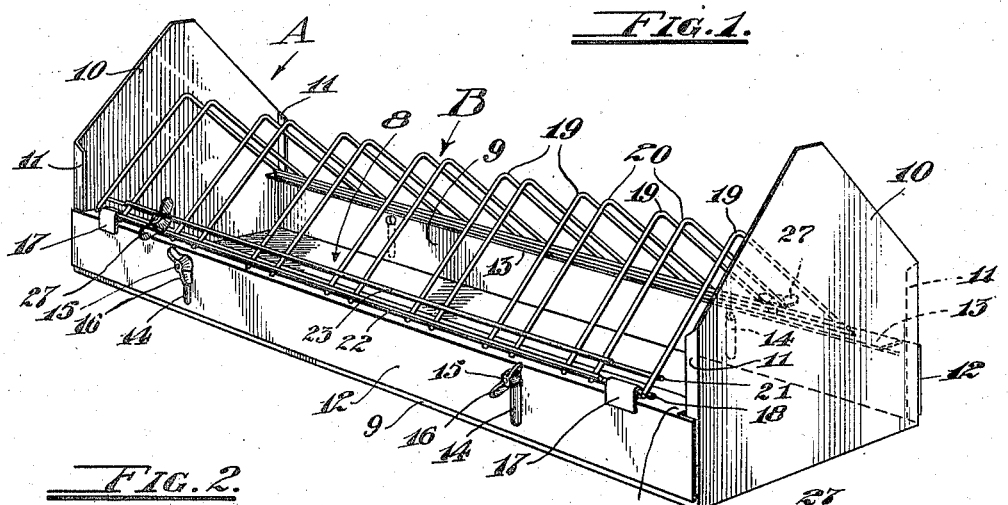
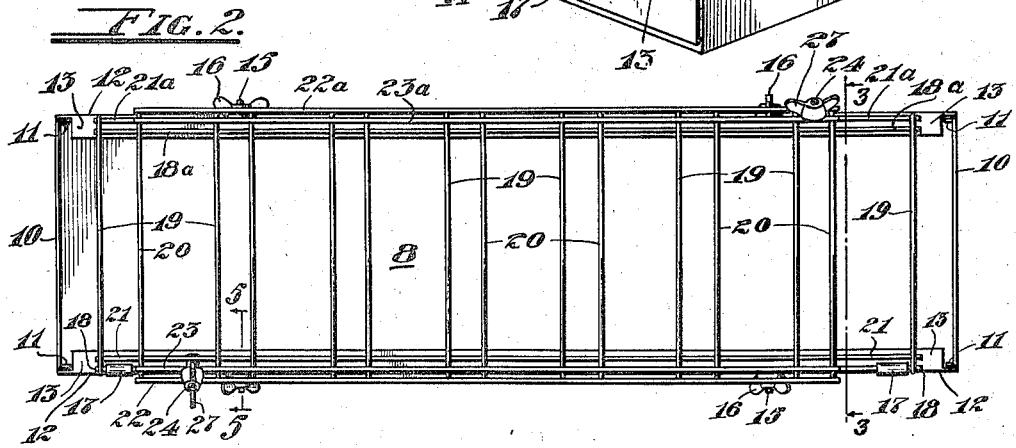
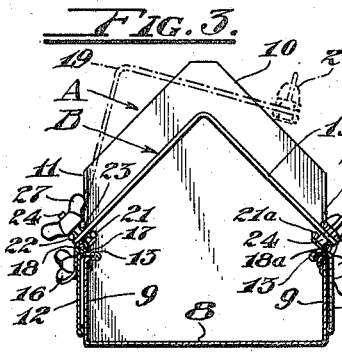
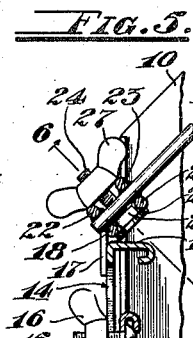
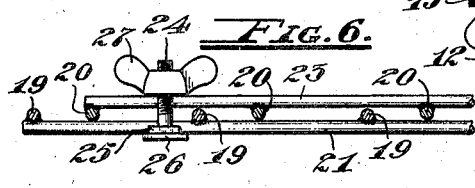
Inventor
Oliver C. White
Atty.

Patented Nov. 12, 1940

2,221,013

UNITED STATES PATENT OFFICE 2,221,013

FEED TROUGH FOR POULTRY

Oliver C. White, Gardena, Calif.

Application August 31, 1938, Serial No. 227,741

4 Claims. (Cl. 119—61)

This invention relates to a feed trough and more particularly pertains to a feed trough of the type embodying a grid for preventing access to the contents of the trough by fowls or animals larger than those of a size for which the feed in the trough is intended.

An object of the invention is to provide a feed trough of the character above described in which the grid is adjustable so as to permit varying the width of the feed openings from time to time to accommodate the trough for use by fowls or animals of various sizes, as at advancing stages of growth, and also to provide means whereby the adjustable grid may be disposed at various heights relative to the trough to further accommodate the trough for use by fowls and other animals of various heights.

Another object is to provide a vertically and longitudinally adjustable grid as an attachment for feed troughs, which is simple in construction and in which the parts may be readily formed and assembled, and in which the adjustments may be easily and quickly effected.

With the foregoing objects in view, together with such other objects and advantages as may subsequently appear, the invention is carried into effect as illustrated by way of example in the accompanying drawing, in which:

Fig. 1 is a perspective view of the feed trough;

Fig. 2 is a plan view thereof;

Fig. 3 is a view in cross section taken on the line 3—3 of Fig. 2 showing the grid in its lowermost position relative to the trough;

Fig. 4 is a view in cross section as seen on the line 3—3 of Fig. 2 showing the grid in an elevated position relative to the trough;

Fig. 5 is an enlarged detail in section taken on the line 5—5 of Fig. 2 showing the grid adjusting means adjacent one of the ends thereof;

Fig. 6 is a detail in longitudinal section as seen on the line 6—6 of Fig. 5.

Referring to the drawing more specifically, A indicates generally a feed trough which is here shown as formed of sheet metal and as embodying a bottom wall or floor 8, parallel side walls 9, and end walls 10, which latter project above the upper margins of the side walls 9 and are formed on their side edges with parallel inturned flanges 11 constituting guides.

Overlying the outer face of each of the side walls 9 is a slide panel 12 having an inturned flange 13 on its upper edge projecting over the side wall 9 and terminating at its ends adjacent the edges of the guide flanges 11. Each of the panels 12 is formed with a pair of parallel vertical slots 14, and mounted on the side walls 9 are threaded stems 15 which project through the slots 14 and are fitted on their outer end portions with wing nuts 16 which are adapted to be screwed on the stems. Said nuts and stems cooperate to form clamping devices whereby said slide panels 12 may be releasably secured in place at various heights in relation to the side walls 9.

Near to each end of one of the adjustable panels 12 there is secured to the outer face of the upper portion thereof a leaf 17 which projects above the upper edge of the panel and has its projecting portion curled loosely around a wire rod 18 extending parallel with the upper margin of the panel 12; the leaves 17 constituting a hinged mounting for the rod 18.

A wire grating B is provided above the trough; this grating being formed in two sections, a carrier section of which the angularly bent, upstanding series of cross wires 19 forms a part, and a carriage section of which a like series of cross wire 20 forms a part. The wires of each of these series are regularly spaced apart longitudinally of the trough, the wires 19 alternating with the wires 20.

The aforesaid carrier section of the grating includes not only the wires 19 but, at each side of the trough, a pair of parallel rods across which the end portions of said wires 19 extend in a contacting, secured relation. One of these pairs of rods is formed by the aforesaid hinged rod 18 in association with a companion rod 21, and the corresponding pair of rods at the opposite side of the trough consists of a lower rod 18a and an upper rod 21a. The carrier section is thus mounted to swing vertically on one of the panels 12.

The aforesaid carriage section of the grating includes not only the cross wires 20 but, at one side of the trough, a pair of parallel rods 22 and 23 and at the opposite side of the trough a like pair of parallel rods 22a and 23a. The lower end portions of said wires 20 underlie and are soldered or otherwise secured to all four of these wires. The pairs of rods 22—23 and 22a—23a are arranged to extend parallel with the rods 18—21 and 18a—21a, and lie on the lower end portions of the cross wires 19 in slidable relation thereto. By the construction which has been described a carrier section of the wire grating is provided, which supports a shiftable series of wires 20.

The cross wires 20 alternate with the cross wires 19 and, when they are shifted close to the latter wires, spaces nearly as wide as the spaces between said wires 19 are provided through which fowls may pass their heads to obtain feed from the trough. When, however, the wires 20 are shifted to points midway between the wires 19 the spaces between the latter wires are divided into two equal parts.

As a means for securing the carriage section in various adjusted positions upon the carrier section of the grating, clamping bolts 24 are provided, these being placed diagonally opposite to each other near corner portions of the trough, as shown. The lower ends of the bolts have heads 25 of a diameter slightly less than the width of the space between the rails of the track-like structures formed by the various paired rods which have been mentioned, said bolt heads each having a peripheral flange 26 of greater diameter than the width of said space. Also said bolts 24 have each a winged nut 27 screwing thereonto, the body portion of said nut having a diameter greater than the width of the space between the aforesaid track rails. By this track, clamping bolt and carrier construction a means is provided for shiftably supporting the grating wires 20 for adjustment longitudinally of the trough to the extent which has been indicated, and for releasably securing the two sections of the grating together after adjustment.

Owing to its hinged connection with the leaves 17 the entire grating structure may be swung to an open position, as indicated by broken lines in Fig. 3, thus leaving the trough entirely unobstructed so that a new supply of feed may more readily be deposited therein. Each of the panels 12 is shown having an inwardly directed top flange 13, this portion of the right hand panel 12 (see Fig. 3) supporting the free edge portion of the grating structure when said structure is in its fully lowered position.

While I have shown and described a specific application of the invention I do not limit myself thereto other than as set forth in the appended claims, and accordingly the invention embraces such changes and modifications as come within the meaning and scope of the claims.

I claim:

1. In a construction of the kind described, an elongated grating structure consisting of a carrier section and of a carriage section which is supported by said carrier section in a longitudinally shiftable relation thereto, said carrier section including a series of cross wires which extend from side to side thereof and are uniformly spaced apart longitudinally thereof, a pair of adjacent parallel rods extending longitudinally along each side of said carrier section, said pairs of parallel rods being in a contacting secured relation to the end portions of said series of wires; the carriage section of said grating being constructed in like manner with a series of cross wires and pairs of adjacent parallel rods in a contacting secured relation to their end portions, said carriage section of the grating being superimposed upon the carrier section thereof in such a position that its parallel rods at each side overlie and align with the parallel rods of the carrier section in an adjustable longitudinally shiftable relation to them and with the cross wires of the carrier section alternating with those of carriage section; clamps engageable with the tracks formed by said parallel rods to clamp said two grating sections together in selected adjusted positions, and means to support both sections of said grating above the otherwise open trough.

2. In a construction of the kind described, an elongated grating structure consisting of a carrier section and of a carriage section which is supported by said carrier section in a longitudinally shiftable relation thereto, said carrier section including a series of cross wires which extend from side to side thereof and are uniformly spaced apart longitudinally thereof, a pair of adjacent parallel rods extending longitudinally along each side of said carrier section, said pairs of parallel rods being in a contacting secured relation to the end portions of said series of wires; the carriage section of said grating being constructed in like manner with a series of cross wires and pairs of adjacent parallel rods in a contacting secured relation to their end portions, said carriage section of the grating being superimposed upon the carrier section thereof in such a position that its parallel rods at each side overlie and align with the parallel rods of the carrier section in an adjustable longitudinally shiftable relation to them and with the cross wires of the carrier section alternating with those of carriage section; clamps engageable with the tracks formed by said parallel rods to clamp said two grating sections together in selected adjusted positions, and means to support both sections of said grating above the otherwise open trough, said clamps consisting of bolts which are insertable between the rails of said superimposed tracks, said bolts having head portions of greater diameter than the space spanned by said tracks and also being furnished with nuts sufficient in diameter simultaneously to engage both rails of one of the superimposed tracks.

3. In combination, a feed trough, a series of wires bridging the space between upper edges of the sides of said trough, mounting means whereby said series of wires are supported in the aforesaid position and in a spaced relation to each other lengthwise of the trough, a second series of wires alternating with the first recited wires and likewise spaced apart lengthwise of the trough, a two-rail track at each side of the trough, the end portions of said second series of wires extending across said tracks in a contacting, secured relation to their rails, and screw-threaded members operatively related to said mounting means and projecting between the rails of said tracks, said members having nuts screwing on to them to clamp said tracks in longitudinally adjusted positions.

4. In a feed trough construction of the kind described wherein the trough body is bridged by a grating including two series of wires, the wires of one series alternating with those of the other in their positions with relation to the length of the trough, a pair of two-rail tracks extending along each side portion of the trough, the end portions of one of said series of wires extending across the rails of one of said tracks each side of the trough in a secured contacting relation, the end portions of the wires of the other series likewise extending across the rails of the other track in a contacting secured relation, a clamp extending between the rails of at least one of said pairs of two-rail tracks to clamp said pair of tracks against each other and affording a means for securing one of said tracks in longitudinally adjusted positions with relation to the other, and means whereby the underlying track at one side of the trough is pivotally connected with the trough to swing in a vertical plane, the opposite side portion of said grating resting by gravity upon an opposite side portion of the trough.

OLIVER C. WHITE.